US012290824B2

(12) United States Patent
Aagaard

(10) Patent No.: US 12,290,824 B2
(45) Date of Patent: May 6, 2025

(54) SOLID BOWL SCREW CENTRIFUGE WITH MIXING BLADES OR PADDLES ARRANGED ON THE SCREW SHAFT

(71) Applicant: GEA MECHANICAL EQUIPMENT GMBH, Oelde (DE)

(72) Inventor: Poul-Erik Aagaard, Sporup (DK)

(73) Assignee: GEA Mechanical Equipment GmbH, Oelde (DE)

( * ) Notice: Subject to any disclaimer, the term of this patent is extended or adjusted under 35 U.S.C. 154(b) by 829 days.

(21) Appl. No.: 17/607,124

(22) PCT Filed: Apr. 24, 2020

(86) PCT No.: PCT/EP2020/061505
§ 371 (c)(1),
(2) Date: Oct. 28, 2021

(87) PCT Pub. No.: WO2020/221668
PCT Pub. Date: Nov. 5, 2020

(65) Prior Publication Data

US 2022/0234053 A1 Jul. 28, 2022

(30) Foreign Application Priority Data

Apr. 29, 2019 (DE) .................... 10 2019 110 996.5

(51) Int. Cl.
*B04B 1/20* (2006.01)
*B04B 11/02* (2006.01)

(52) U.S. Cl.
CPC ................ *B04B 1/20* (2013.01); *B04B 11/02* (2013.01); *B04B 2001/2041* (2013.01)

(58) Field of Classification Search
CPC .... B04B 1/20; B04B 11/02; B04B 2001/2041
See application file for complete search history.

(56) References Cited

U.S. PATENT DOCUMENTS 6,749,552 B1 * 6/2004 Figgener .................. B04B 1/20 494/53
2008/0110577 A1 5/2008 Winsness
(Continued)

FOREIGN PATENT DOCUMENTS

DE 4222119 A1 * 1/1994 .............. B03B 5/32
DE 19952804 A1 5/2001
(Continued)

OTHER PUBLICATIONS

Office Action created Jan. 30, 2024 in related/corresponding JP Application No. 2021564248.
(Continued)

*Primary Examiner* — Krishnan S Menon
*Assistant Examiner* — Shuyi S. Liu
(74) *Attorney, Agent, or Firm* — PATENT PORTFOLIO BUILDERS PLLC

(57) ABSTRACT

A solid bowl screw centrifuge includes a housing and a rotor rotatably mounted in the housing. The centrifuge has a rotatable drum having an axis of rotation, the drum having a cylindrical section having a length $L_1$ and a conical section having a length $L_2$. The centrifuge also has a first inlet for feeding a suspension to be processed into the drum and a liquid outlet arranged in the cylindrical section of the drum and a solids outlet arranged in the conical section of the drum. A screw is arranged in the drum and rotatable at a differential speed relative to the rotatable drum, the drum and the screw together forming the rotor. The centrifuge also a second inlet for supplying an additive to a solid phase within the drum.

14 Claims, 4 Drawing Sheets

(56) References Cited

U.S. PATENT DOCUMENTS

| | | | | |
|---|---|---|---|---|
| 2008/0125612 | A1* | 5/2008 | Bruckmayer ............ | B04B 1/20 210/512.3 |
| 2012/0064213 | A1 | 3/2012 | Lee | |

FOREIGN PATENT DOCUMENTS

| | | | | |
|---|---|---|---|---|
| DE | 102006056934 | A1 | 6/2008 | |
| ES | 2338964 | A1 * | 5/2010 | .............. C11B 1/06 |
| JP | H02160063 | A | 6/1990 | |
| JP | H0775747 | A | 3/1995 | |
| JP | 2003326195 | A | 11/2003 | |
| JP | 2013154327 | A | 8/2013 | |
| WO | 9401219 | A1 | 1/1994 | |
| WO | 2017182949 | A1 | 10/2017 | |

OTHER PUBLICATIONS

International Search Report mailed Jul. 15, 2020 in related/corresponding International Application No. PCT/EP2020/061505.

Search Report created Feb. 28, 2020 in related/corresponding DE Application No. 10 2019 110 996.5.

Written Opinion mailed Jul. 15, 2020 in related/corresponding International Application No. PCT/EP2020/061505.

* cited by examiner

SOLID BOWL SCREW CENTRIFUGE WITH MIXING BLADES OR PADDLES ARRANGED ON THE SCREW SHAFT

BACKGROUND AND SUMMARY OF THE INVENTION

Exemplary embodiments of the invention relate to a solid bowl screw centrifuge.

FIG. 4 shows a solid bowl screw centrifuge according to the prior art. The drum of such a centrifuge is divided into a conical region and a cylindrical region, wherein the cylindrical region is generally referred to by a person skilled in the art as the separating zone and the conical region as the drying zone.

This design has proven itself as such. Nonetheless, there is a further demand for improving the design of solid bowl screw centrifuges in such a way that they have further functionalities and thus subsequent work steps can be saved.

WO 2017/182949 discloses, in particular in FIG. 3*a*, an assembly for processing drilling sludge in a solid bowl screw centrifuge. For this purpose, a sacrificial liquid for transporting solids was introduced in addition to the solid-loaded drilling sludge into the solid bowl screw centrifuge. The sacrificial liquid then displaces the drilling sludge while a solid phase is transported further.

Ultimately, a solid phase is to be separated, an additional use of the drying zone for other purposes is not disclosed.

Exemplary embodiments of the invention are directed to expanding the functionality of the drying zone.

A solid bowl screw centrifuge according to the invention has a housing and a rotor rotatably mounted in the housing. The solid bowl screw centrifuge moreover at least has the following:

- a rotatable drum having a rotational axis, wherein the drum has a cylindrical section having a length $L_1$ and a conical section having the length $L_2$,
- at least one first feed for supplying a suspension to be processed into the drum,
- at least one liquid outlet, which is arranged in the cylindrical section of the drum, and at least one solid discharge, which is arranged in the conical section of the drum,
- a screw, which is rotatable relative to the rotatable drum at a differential speed and is arranged in the drum, wherein the drum and the screw jointly form the rotor.

The solid bowl screw centrifuge according to the invention has a second feed for supplying an additive to a solid phase inside the drum.

Due to the additional feed into the solid phase, the advantages of a mixing device can be combined with those of a decanter. Additional downstream mixing de-vices can advantageously be omitted, and the space required for the corresponding machines in a processing plant is thus significantly reduced.

The second feed can be arranged at least partially concentrically to the rotational axis of the solid bowl screw centrifuge. A line for liquids or solids into a specific region of the drum is to be understood as a feed. The line can be a pipeline, for example. At least one section of the line extends concentrically to the rotational axis.

The second feed can advantageously have a feed pipe protruding into a hollow shaft of the screw shaft of the screw. Furthermore, the second feed can have an apparatus for the radial discharge of the additive from the screw via at least one orifice opening. The orifice opening can be introduced into the wall of the screw shaft. Multiple orifice openings are also possible, of course.

The first feed can moreover have a feed pipe protruding into the screw shaft of the screw, wherein the first feed has an apparatus for the radial discharge of the suspension to be processed from the screw via an orifice opening, wherein the orifice opening of the second feed is arranged between the orifice opening of the first feed and the solid discharge.

The orifice opening of the second feed can preferably be arranged in the conical section.

The feed pipe of the second feed can be arranged on a side of the solid bowl screw centrifuge opposite to the feed pipe of the first feed, so that the two feed pipes do not obstruct one another.

Alternatively, the feed pipe of the second feed can be arranged inside the feed pipe of the first feed and in particular concentrically thereto. This is advantageous if the supply of the suspension and the additive is to take place from one side, for example, from a metering device.

An immersion disk, which protrudes radially out of the surface of the screw shaft and leaves open an annular gap to the drum inner wall, can be arranged between the orifice opening of the second feed and the orifice opening of the first feed. The immersion disk makes it possible for only thickened solids (heavy phase) to pass close to the drum inner wall from the cylindrical section of the drum into the conical section. The liquid component of the suspension (light phase) remains in the cylindrical section of the drum. The immersion disk has different levels on both sides here. Since the thickened solid separated in the cylindrical section has a higher density than the supplied suspension, the suspension fill level on one side of the solid bowl screw centrifuge has to be higher than the solid fill level on the other side of the solid bowl screw centrifuge.

At least one mixing element can preferably be arranged in the conical section, which protrudes out of the screw shaft or the drum wall of the drum into the intermediate space between the screw shaft and the drum. Multiple mixing elements, for example, mixing paddles or mixing blades, can particularly preferably also be arranged.

The apparatus for the radial discharge of the additive or the dispersion to be processed can be formed in particular as a pipeline or as a distributor, wherein the distributor is formed as a chamber inside the screw shaft into which the feed pipe opens. The screw shaft, as a wall delimiting the chamber, has at least one orifice opening into the centrifuge space between the screw shaft and the drum wall.

The immersion disk can advantageously be arranged in a transition region in which the cylindrical section merges into the conical section.

The feed pipe of the second feed can be rotatably mounted.

A use according to the invention of the above-mentioned solid bowl screw centrifuge according to the invention is used for mixing the solid phase in the conical section of the drum with a liquid, gaseous, or solid additive, which is supplied via the second feed to the solid phase, wherein the conical section of the drum is used at least in regions as a mixing zone, in which mixing of the solid phase with the supplied additive takes place.

In this context, a specific use of the solid bowl screw centrifuge takes place in a method for processing a stillage to form a dry stillage, wherein the stillage is supplied via the first feed of the solid bowl screw centrifuge and wherein processing of the stillage into a thin stillage and a solid phase takes place in the solid bowl screw centrifuge, wherein a syrup obtained from the thin stillage during the processing in the solid bowl screw centrifuge is supplied to the solid phase as an additive in the drum via the second feed.

The syrup from the thin stillage can be obtained by at least one evaporator, preferably by an evaporator and a downstream 3-phase separator, while additionally obtaining corn oil.

BRIEF DESCRIPTION OF THE DRAWING FIGURES

In the following, the invention is described in more detail with reference to the drawing on the basis of exemplary embodiments. In the figures.

DETAILED DESCRIPTION

Figure 4:
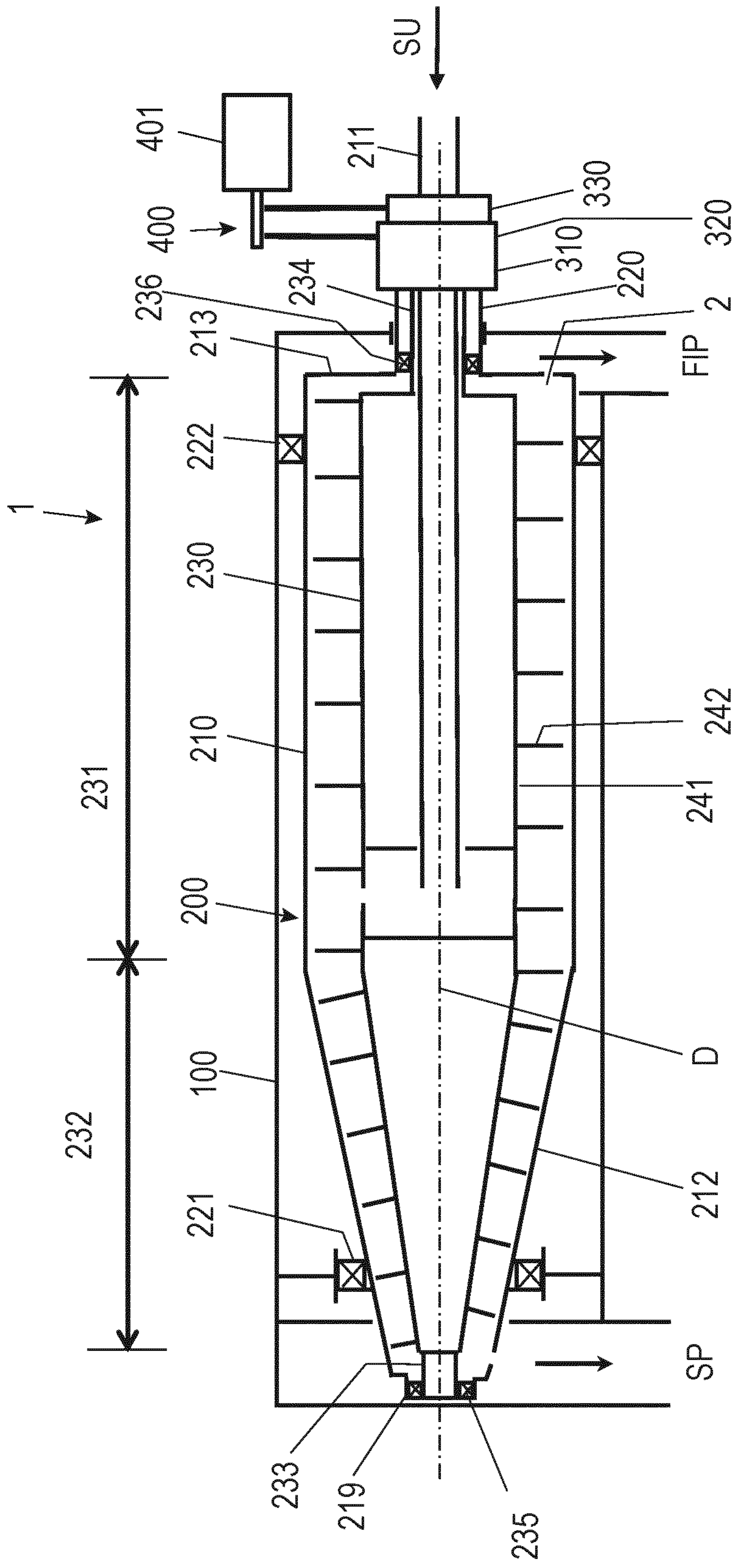
FIG. 4 shows a side view of a schematically shown solid bowl screw centrifuge according to the prior art.

FIG. 4 shows a solid bowl screw centrifuge 1 having a rotatably mounted drum 210, wherein a first drum shaft section 220, which is connected in a rotationally-fixed manner to the drum 210, axially adjoins a drum cover 213 of the drum 210 or the actual drum 210, and a second drum shaft section 219, which is also connected in a rotationally-fixed manner to the drum 210, axially adjoins the conical drum section 212.

Inside the drum 210, a rotatably mounted screw 230 is arranged concentrically to the drum 210. The screw comprises a screw shaft 241 formed as a hollow shaft and a helical winding 242

The drum 210 and the screw 230 each have a cylindrical section 231 and a conical section 232. A first screw shaft section 234, which is connected in a rotationally-fixed manner to the screw 230, axially adjoins the cylindrical section 231 of the screw 230, and a second screw shaft section 233, which is also connected in a rotationally-fixed manner to the screw 230, axially adjoins the conical drum section 232.

A drive device 400 having one or two motors 401 is used to drive the rotor 200. At least one gear 310 is connected downstream of the drive device 400, on which two belt pulleys 320, 330 are schematically shown here, which indicates that the gear 310 has at least two interfaces for feeding a respective torque of the motor or the motors into the gear 310 to drive the drum and the screw. Alternatively (not shown here), the drive of the rotor can also take place via hydraulic motors so that a gear is not required. The drive can also take place by way of a combination of electric motor(s) and hydraulic motor(s), wherein other gears are used for this purpose and the belt pulleys are entirely or partially omitted.

The gear 300 rotates the drum 210, on the one hand, and the screw 230, on the other hand. For this purpose, the gear 300 has two output shafts. The first output shaft is coupled in a rotationally-fixed manner to the first drum shaft section 220 or is coupled directly to the drum 210 and the second output shaft is coupled directly or indirectly in a rotationally-fixed manner to the first screw shaft section 234 or directly to the screw 230.

The drum and the shaft are each rotatably mounted using two drum bearings 221, 222 arranged axially in the direction of the rotational axis. The concept of the "bearing" is not to be interpreted narrowly in this regard. Each of the bearings 221, 222 can respectively consist of one or multiple individual bearings, which are then arranged axially directly adjacent to one another so that they can functionally each be considered to be an individual bearing. The bearings 221, 222 can moreover be formed as bearings of greatly varying design, thus as roller bearings—in particular as ceramic bearings, as hybrid ceramic bearings, as magnetic bearings, or as plain bearings.

The drum bearings 221, 222 are arranged between the drum 210 and the housing 100 or a part connected to the housing so that the drum 210 can be rotated relative to the housing 100. This also applies for all variants described hereinafter and falling under the claims. The drum bearings 221, 222 are preferably arranged radially between the drum 210 and the housing 100 or a part connected to the housing.

The screw bearings 235, 236, in contrast, are arranged radially between the screw 230 and the drum 210, so that the screw 230 is rotatable relative to the drum 210. The screw bearings 235, 236 are preferably arranged radially between the drum 210 and the screw 230.

In one possible embodiment variant (not shown), the one of the screw bearings 235 in the region of the solid discharge 218 can be omitted. In this case, the rotating screw centers itself automatically, which is known, for example, in the case of a vertical arrangement of the decanter.

According to the prior art, as shown in FIG. 4, the cylindrical region 231 of the solid bowl screw centrifuge is used as a separating zone for a supplied suspension SU to be divided into a liquid phase FIP and a solid phase SP. The conical region 232 is used as a drying zone, in which the solid phase is dried further. The invention begins at this point and follows a different path.

Figure 1:
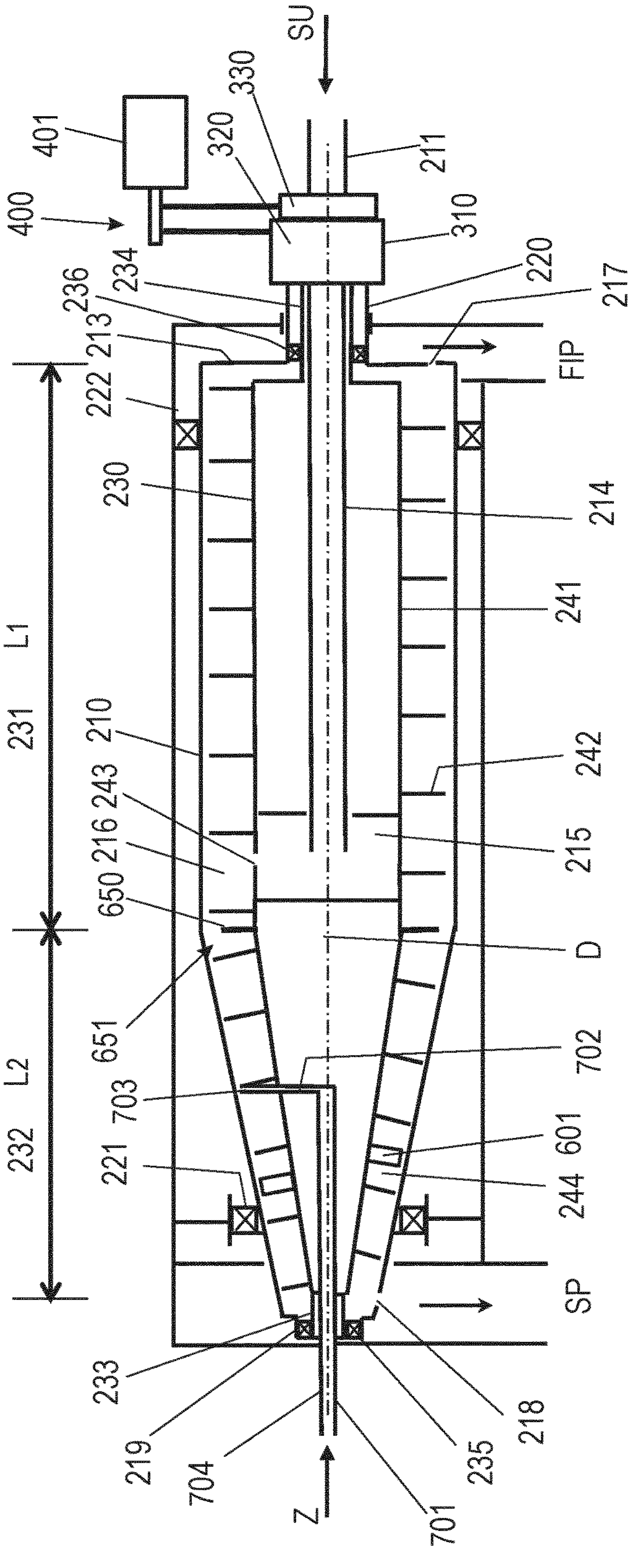
FIG. 1 shows a side view of a schematically shown solid bowl screw centrifuge according to the invention.

FIG. 1 shows a solid bowl screw centrifuge 1 having a frame, which is not rotatable or does not rotate in operation, and preferably a housing 100 and a rotor 200, which is rotatable or rotates in operation. The solid bowl screw centrifuge shown has numerous similar components in relation to the prior art in FIG. 4. These are identified by the same reference signs.

The rotor 200 has a rotatable drum 210 having a horizontal rotational axis D. However, the rotational axis D can also be oriented differently, in particular vertically in space. Moreover, a screw 230 arranged in the drum 210, the rotational axis of which corresponds to that of the drum 210, is part of the rotor 200. The screw 230 can be rotated in operation with a differential speed to the drum 210.

The drum 210 has a cylindrical section 231 having a length $L_1$ and a conical section 232 adjoining axially thereon having a length $L_2$. The cylindrical section 231 is terminated by an essentially radially extending drum cover 213.

The screw 230 also has a cylindrical section and a conical section adjoining axially thereon here. It is arranged inside the drum 210.

The solid bowl screw centrifuge moreover has a feed 211 for supplying a suspension SU to be processed into the drum 210 and in particular into a centrifuge space 216 inside the drum 210. This feed is formed in FIGS. 1 and 4 in such a way that a feed pipe 214 extending concentrically to the rotational axis D here protrudes into the drum 210, which pipe opens into a distributor 215, by which the suspension SU to be processed can be conducted radially via an orifice opening 243 in the screw shaft 241 into a centrifuge space 216 of the drum 210. The feed pipe 214 can either be guided from the side of the cylindrical drum section into the drum 210 or it can be guided from the side of the conical drum section into the drum 210.

One or multiple liquid drains 217 can be formed in or on the drum cover 213. These can be formed in various ways, thus as openings in the drum cover 213, which have a type of overflow weir, or in another way, thus as an impeller. At least one solid discharge 218 is formed at the end of the conical section 212.

In general, the drum 210 is formed as a solid bowl drum. At least one liquid phase FIP is then clarified of solids SP in the rotating drum 210. The at least one liquid phase exits at the drum cover 213 from the liquid drain 217. The solids, in contrast, are transported by the screw 230 in the direction of the solid discharge 218 and ejected there from the drum 210.

In contrast to FIG. 4, a feed 701 for an additive Z is arranged between the orifice opening 243 of the distributor 215 and the solid discharge 218 in FIG. 1.

Specifically, in FIG. 1, a second feed pipe 704 is arranged as a feed 701 for additives Z coaxially to the rotational axis D. This protrudes opposite to the feed pipe 214 into the interior of the screw shaft 241. From the feed pipe 704, a line 702 extends radially in the direction of the drum casing, so that the additive to be introduced is deflected via this line 702. The line 702 has an orifice opening 703, which is located in the region between the screw shaft 241 and the drum casing of the drum 210.

Due to the rotation of the screw 230, intensive mixing of the additive Z and the solid phase SP takes place in the conical region 232 of the solid bowl screw centrifuge. The conical region 232 can thus be referred to as a mixing zone, while the cylindrical region 231 is still the separating zone.

The special advantage in the design according to the invention is that the drying zone is additionally utilized as a mixing device due to the provided windings 242 of the screw 230. Normally, a mixing device would be connected downstream of the solid bowl screw centrifuge. However, the illustrated design advantageously enables such a mixing device to be dispensed with entirely.

The statements on the feed 701 according to FIG. 1 are in no way to be understood as exhaustive. Rather, other advantageous arrangements of the feed 701 are also conceivable in the scope of the present invention.

In a first modification to FIG. 1, the feed pipe 701 can also be led from the side of the cylindrical drum section into the drum 210. In this case, the second feed pipe 704 for additives can be arranged coaxially inside the feed pipe for the suspension to be processed. Metering of suspension and additive can thus take place from one side, for example.

In a second modification to FIG. 1, the line 702 can be replaced by a distributor, similarly to the distributor 215. Such a distributor is preferably formed as a chamber inside the screw shaft into which the respective feed pipe opens. This arrangement has the advantage that the feed pipe does not have to be embodied as rotating. The chamber has one orifice opening or multiple orifice openings in the centrifuge space 216 between the screw shaft 241 and the drum wall.

In a third modification of FIG. 1, the feed into the centrifuge space 216 can also take place through the drum wall.

In the transition region between the cylindrical and the conical section of the screw 230, an optional immersion disk 650 is arranged along the screw shaft, which extends radially in the direction of the drum wall of the drum 210. The immersion disk 650 can extend in particular perpendicularly to the rotational axis D from the screw shaft 241 and can also be arranged, inter alia, in the conical region or in the cylindrical region. It is essential that it is arranged between the orifice opening 703 of the second feed 701 for the additive and the orifice opening 243 of the distributor.

The outer contour of the immersion disk 650 forms a gap in the form of a circular ring, the so-called immersion ring gap 651, with the inner wall of the drum, through which the solid reaches the solid discharge 218 from the separating zone 231. The liquid-side end of the separating zone 231 can be sealed off from the surroundings, which is implementable, for example, by an internal impeller or a hydrohermetic seal. A hermetic closure of the separating zone 231 can thus be achieved if needed.

A further addition to the concept according to the invention is the arrangement of mixing elements 601, for example, of mixing blades or mixing paddles, in addition to the windings 242 of the screw 230 along the wall of the screw shaft 241. These mixing elements preferably protrude into the thread or the threads 244 between the windings 242 and enable the mixing of the separated solids of the suspension SU to be made more intensive with the additive Z introduced via the feed line 701.

Figure 2:
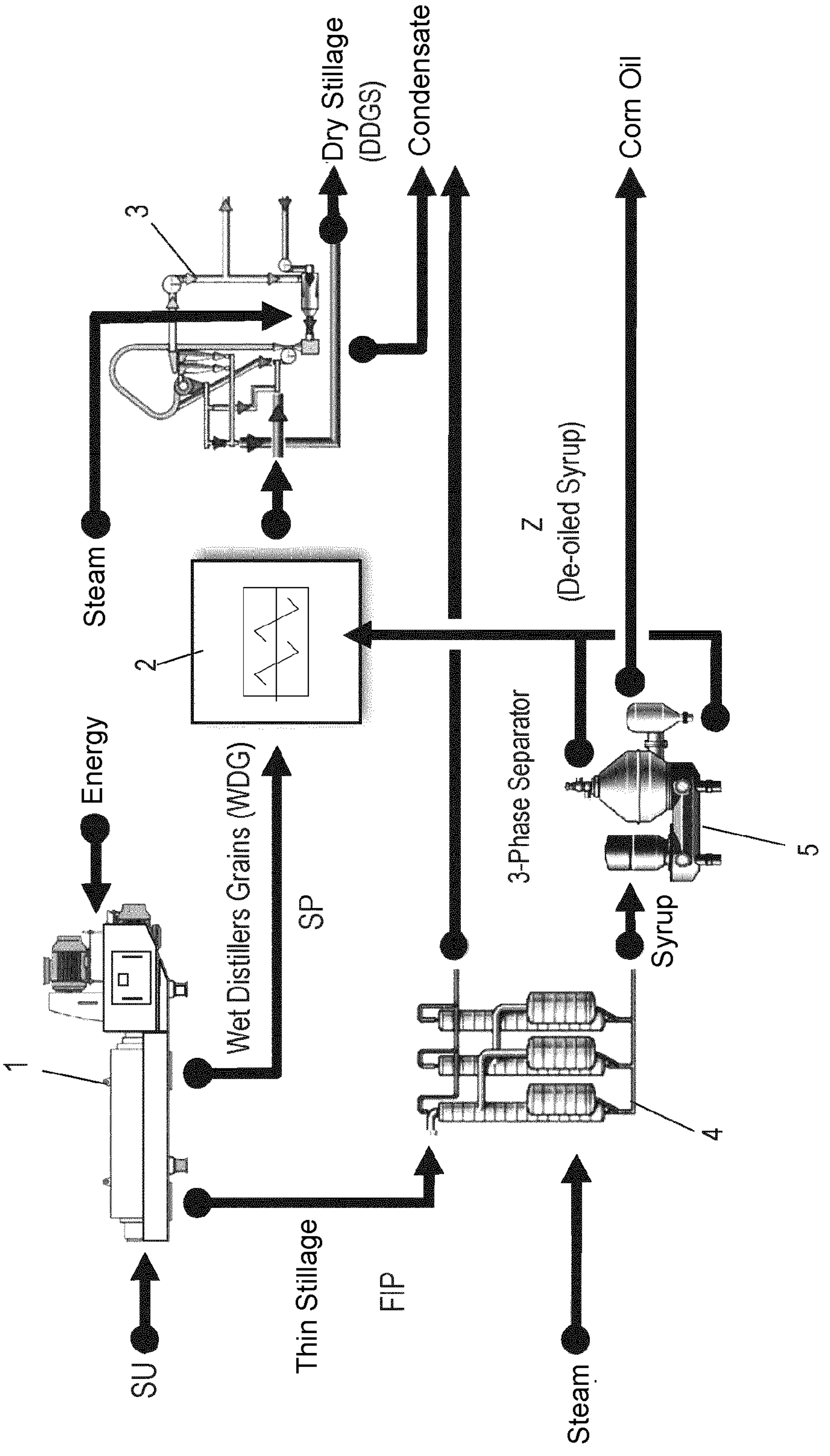
FIG. 2 shows a method scheme according to the prior art.
Figure 3:
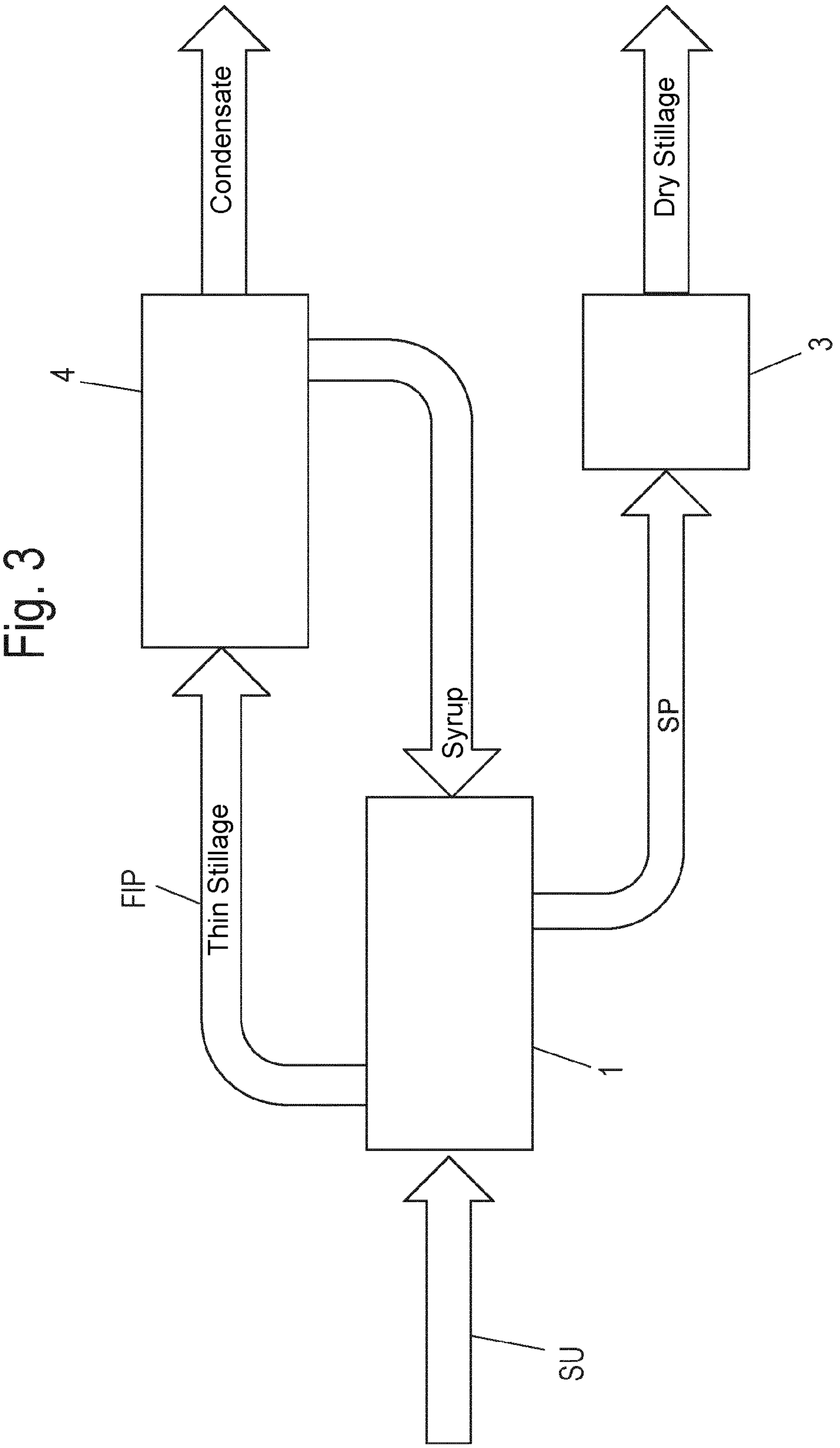
FIG. 3 shows a method scheme using a solid bowl screw centrifuge according to the invention.

A use according to the invention of the solid bowl screw centrifuge 1 according to the invention and its advantages is explained in more detail on the basis of FIGS. 2 and 3.

In FIG. 2, the treatment of stillage as a suspension SU is explained in more detail. Stillage (stillage or whole stillage) results when obtaining alcohol from plants, in particular from corn. This stillage has to be processed for waste disposal.

This stillage SU is treated in a conventional solid bowl screw centrifuge 1 with the supply of energy. A partially-dehydrated stillage (Wet Distillers Grains WDG) as the solid phase and a thin stillage as the liquid phase are provided in this case.

The thin stillage (FIP) is supplied to an evaporator 4, which provides a syrup with removal of a large quantity of water as water steam or condensate. This syrup is further processed by means of a 3-phase separator 5. A useful material phase can be separated here as corn oil. The further liquid phase and the solids that arise during the 3-phase separation are then supplied to the solid phase SP of the solid bowl screw centrifuge 1.

Intensive mixing of the two phases takes place in a mixer 2. The product is further processed to form a dry stillage (dried distillers grains DDGS) in a dryer 3 with introduction of steam or hot air. Intensive mixing of the syrup with the dehydrated stillage is necessary since the dryer 3 cannot process clumps having excessive syrup. These clumps would remain adhering in the dryer and combust therein.

If the solid bowl screw centrifuge 1 according to the invention is used, a mixer 2 can advantageously be omitted. This is shown in FIG. 3. The syrup produced from the thin stillage FIP in the evaporator 4 can be returned directly back into the solid bowl screw centrifuge 1. A separator can be interconnected similarly to FIG. 2 to separate corn oil from the syrup, since in this way the subsequent mixing of the de-oiled syrup with the dehydrated stillage is promoted.

The free-flowing solid phase SP, which now contains a syrup, is then transferred into a dryer 3, which provides the dry stillage DDGS.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 solid bowl screw centrifuge
2 mixer
3 dryer
4 evaporator
5 3-phase separator
100 housing
200 rotor
210 drum
211 feed
212 conical drum section
213 drum cover
214 feed pipe
215 distributor
216 centrifuge space
217 liquid drain
218 solid discharge
219 drum shaft section
220 drum shaft section
221 drum bearing
222 drum bearing
230 screw
231 cylindrical section
232 conical section
233 screw shaft section
234 screw shaft section
235 screw bearing
236 screw bearing
241 screw shaft
242 windings
243 orifice opening
244 winding thread
310 gear
320 belt pulley
330 belt pulley
400 drive device
401 motor
601 mixing elements
650 immersion disk
651 immersion disk
701 second feed
702 line
703 orifice opening
704 feed pipe
D rotational axis
$L_1$ length
$L_2$ length
SU suspension
SP solid phase
FlP liquid phase
Z additives

The invention claimed is:

1. A solid bowl screw centrifuge, comprising:
a housing;
a rotor rotatably mounted in the housing;
a rotatable drum having a rotational axis, wherein the rotatable drum has a cylindrical section having a length $L_1$ and a conical section having the length $L_2$;
at least one first feed configured to supply a suspension to be processed into the rotatable drum;
at least one liquid drain arranged in the cylindrical section of the rotatable drum;
at least one solid discharge arranged in the conical section of the rotatable drum;
a screw having windings and a screw shaft, wherein the screw is rotatable relative to the rotatable drum at a differential speed and is arranged in the rotatable drum, wherein the rotatable drum and the screw jointly form the rotor;
a second feed configured to supply an additive to a solid phase inside the rotatable drum, wherein the second feed is arranged coaxially to the rotational axis, and wherein the second feed protrudes into an interior of the screw shaft opposite to the at least one first feed;
a line radially extending from the second feed in a direction of a casing of the rotatable drum, wherein the line is configured to deflect the additive, and wherein the line has an orifice opening located in a region between the screw shaft and the casing of the rotatable drum; and
mixing blades or mixing paddles, in addition to the windings of the screw, are arranged along a wall of the screw shaft.

2. The solid bowl screw centrifuge of claim 1, wherein the second feed is arranged at least partially concentrically to the rotational axis of the rotatable drum.

3. The solid bowl screw centrifuge of claim 1, wherein the second feed has a feed pipe protruding into the screw shaft of the screw, and the second feed has an apparatus configured to radially discharge the additive from the screw via the orifice opening.

4. The solid bowl screw centrifuge of claim 3, wherein the first feed has a feed pipe protruding into the screw shaft of the screw, and the first feed has an apparatus configured to radially discharge the suspension to be processed from the screw via a further orifice opening, wherein the orifice opening of the second feed is arranged between the further orifice opening of the first feed and the at least one solid discharge.

5. The solid bowl screw centrifuge of claim 4, wherein the orifice opening of the second feed is arranged in the conical section.

6. The solid bowl screw centrifuge of claim 4, wherein the feed pipe of the second feed is arranged on a side of the solid bowl screw centrifuge opposite to the feed pipe of the first feed.

7. The solid bowl screw centrifuge of claim 3, wherein the apparatus for radially discharging the additive to be processed is a pipeline or a distributor, wherein the distributor is formed as a chamber inside the screw shaft, into which the feed pipe of the first feed opens and which has the further orifice opening in the wall of the screw shaft.

8. The solid bowl screw centrifuge of claim 1, further comprising:
an immersion disk, which protrudes radially out of a surface of the screw shaft, is arranged between the orifice opening of the second feed and the further orifice opening of the first feed.

9. The solid bowl screw centrifuge of claim 8, wherein the immersion disk is arranged in a transition region, in which the cylindrical section merges into the conical section.

10. The solid bowl screw centrifuge of claim 1, wherein the mixing blades or mixing paddles protrude out of the screw shaft into an intermediate space between the screw shaft and the rotatable drum and are arranged in the conical section.

11. The solid bowl screw centrifuge of claim 3, wherein the feed pipe of the second feed is rotatably mounted.

12. A method, comprising:

providing a solid bowl screw centrifuge, which comprises a housing;

a rotor rotatably mounted in the housing;

a rotatable drum having a rotational axis, wherein the rotatable drum has a cylindrical section having a length $L_1$ and a conical section having the length $L_2$;

at least one first feed configured to supply a suspension to be processed into the rotatable drum;

at least one liquid drain arranged in the cylindrical section of the rotatable drum;

at least one solid discharge arranged in the conical section of the rotatable drum;

a screw having windings and a screw shaft, wherein the screw is rotatable relative to the rotatable drum at a differential speed and is arranged in the rotatable drum, wherein the rotatable drum and the screw jointly form the rotor;

a second feed configured to supply an additive to a solid phase inside the rotatable drum, wherein the second feed is arranged coaxially to the rotational axis, and wherein the second feed protrudes into an interior of the screw shaft opposite to the at least one first feed;

a line radially extending from the second feed in a direction of a casing of the rotatable drum, wherein the line is configured to deflect the additive, and wherein the line has an orifice opening located in a region between the screw shaft and the casing of the rotatable drum; and mixing blades or mixing paddles, in addition to the windings of the screw, are arranged along a wall of the screw shaft;

supplying a liquid, gaseous, or solid additive via the second feed to the conical section of the rotatable drum;

mixing the solid phase in the conical section of the rotatable drum with the liquid, gaseous, or solid additive; and using the conical section of the rotatable drum, at least in regions, as a mixing zone, in which mixing of the solid phase with the supplied additive occurs.

13. The method of claim 12, wherein the method processes a stillage to form a dry stillage, wherein the stillage is supplied via the first feed to the solid bowl screw centrifuge and wherein processing of the stillage to form a thin stillage and a solid phase occurs in the solid bowl screw centrifuge, wherein a syrup obtained from the thin stillage during the processing in the solid bowl screw centrifuge is supplied to the solid phase as the additive in the drum via the second feed.

14. The method of claim 13, wherein the syrup from the thin stillage is obtained by an evaporator and a downstream 3-phase separator while additionally obtaining corn oil.

* * * * *